United States Patent [19]
Higashide

[11] 3,803,568

[45] Apr. 9, 1974

[54] SYSTEM CLOCK FOR ELECTRONIC COMMUNICATION SYSTEMS

[75] Inventor: Carlos S. Higashide, Elk Grove Village, Ill.

[73] Assignee: GTE Automatic Electric Laboratories Incorporated, Northlake, Ill.

[22] Filed: Apr. 6, 1973

[21] Appl. No.: 348,807

[52] U.S. Cl....... 340/213 R, 340/248 P, 340/253 P, 340/333, 307/65, 307/219, 333/3

[51] Int. Cl. ........................................ H04m 11/04

[58] Field of Search ............ 340/213 R, 333, 248 P, 340/253 P, 146.1 BE; 307/64, 65, 71, 219, 204, 216; 328/128; 333/3; 325/2; 235/153 AE

[56] References Cited

UNITED STATES PATENTS

| | | | |
|---|---|---|---|
| 3,748,500 | 7/1973 | Tam | 307/219 |
| 3,619,775 | 11/1971 | Naylor et al. | 340/248 P |
| 3,668,677 | 6/1972 | Higgs | 340/248 P |
| 2,984,789 | 5/1961 | O'Brian | 340/253 P |
| 3,681,694 | 8/1972 | Sarati | 325/2 |
| 3,204,204 | 8/1965 | Buxton | 333/3 |
| 3,667,048 | 5/1971 | Hanson | 325/2 |

*Primary Examiner*—John W. Caldwell
*Assistant Examiner*—R. Lange
*Attorney, Agent, or Firm*—B. E. Franz

[57] ABSTRACT

The system clock of the present invention is designed in such a manner that it is "fail-safe," and a single failure of any kind will not prevent generation of clock pulses. More particularly, the system clock consists of two identical clock cards wired for redundant operation. One clock card functions as the main system clock (MSC), and the other functions as the standby system clock (SSC). Clock pulses normally are provided by the MSC to the appropriate subsystem timing generators, however, if a fault develops in the MSC, the pulse output of the MSC is inhibited and the function of providing pulses is transferred to the SSC. The transfer feature always takes place when an ALARM lead on the MSC goes to a logic one.

12 Claims, 3 Drawing Figures

SYSTEM CLOCK FOR ELECTRONIC COMMUNICATION SYSTEMS

This invention relates to a processor controlled communication switching system and, more particularly, to a system clock for use in such a system.

CROSS REFERENCE TO RELATED APPLICATIONS

The preferred embodiment of the invention is incorporated in a PROCESSOR CONTROLLED COMMUNICATION SWITCHING SYSTEM, U.S. Pat. application Ser. No. 130,133, now abandoned filed Apr. 1, 1971, by K. E. Prescher, R. E. Schauer and F. B. Sikorski, and a continuation-in-part thereof, Ser. No. 342,323 filed Mar. 19, 1973, hereinafter referred to as the SYSTEM application. The system may also be referred to as No. 1 EAX or simply EAX.

The memory access, and the priority and interrupt circuits for the register-sender subsystem are covered by U.S. patent application Ser. No. 139,480, filed May 3, 1971, by C. K. Buedel for a MEMORY ACCESS APPARATUS PROVIDING CYCLIC SEQUENTIAL ACCESS BY A REGISTER SUBSYSTEM AND RANDOM ACCESS BY A MAIN PROCESSOR IN A COMMUNICATION SWITCHING SYSTEM, hereinafter referred to as the REGISTER-SENDER MEMORY CONTROL patent application. The register-sender subsystem is described in U.S. patent application Ser. No. 201,851, filed Nov. 24, 1971, by S. E. Puccini for DATA PROCESSOR WITH CYCLIC SEQUENTIAL ACCESS TO MULTIPLEXED LOGIC AND MEMORY, hereinafter referred to as the REGISTER-SENDER patent application. Maintenance hardware features of the register-sender are described in four U.S. patent applications having the same disclosure filed July 12, 1972, Ser. No. 270,909, by J. P. Caputo and F. A. Weber for a DATA HANDLING SYSTEM ERROR AND FAULT DETECTING AND DISCRIMINATING MAINTENANCE ARRANGEMENT, Ser. No. 270,910, by C. K. Buedel and J. P. Caputo for a DATA HANDLING SYSTEM MAINTENANCE ARRANGEMENT FOR PROCESSING SYSTEM TROUBLE CONDITIONS, Ser. No. 270,912, by C. K. Buedel and J. P. Caputo for a DATA HANDLING SYSTEM MAINTENANCE ARRANGEMENT FOR PROCESSING SYSTEM FAULT CONDITIONS, and Ser. No. 270,916, by J. P. Caputo and G. O'Toole for a DATA HANDLING SYSTEM MAINTENANCE ARRANGEMENT FOR CHECKING SIGNALS these four applications being referred to hereinafter as the REGISTER-SENDER MAINTENANCE patent applications.

The marker for the system is disclosed in the U.S. Pat. No. 3,681,537, issued Aug. 1, 1972, by J. W. Eddy, H. G. Fitch, W. F. Mui and A. M. Valente for a MARKER FOR COMMUNICATION SWITCHING SYSTEM, and U.S. Pat. No. 3,678,208, issued July 18, 1972, by J. W. Eddy for a MARKER PATH FINDING ARRANGEMENT INCLUDING IMMEDIATE RING; and also in U.S. patent applications Ser. No. 281,586, filed Aug. 17, 1972, by J. W. Eddy for an INTERLOCK ARRANGEMENT FOR A COMMUNICATION SWITCHING SYSTEM, Ser. No. 311,606, filed Dec. 4, 1972, by J. W. Eddy and S. E. Puccini for a COMMUNICATION SYSTEM CONTROL TRANSFER ARRANGEMENT, Ser. No. 303,157, filed Nov. 2, 1972, by J. W. Eddy and S. E. Puccini for a COMMUNICATION SWITCHING SYSTEM INTERLOCK ARRANGEMENT, hereinafter referred to as the MARKER patents and applications.

The communication register and the marker transceivers are described in U.S. patent application Ser. No. 320,412, filed Jan. 2, 1973, by J. J. Vrba and C. K. Buedel for a COMMUNICATION SWITCHING SYSTEM TRANSCEIVER ARRANGEMENT FOR SERIAL TRANSMISSION, hereinafter referred to as the COMMUNICATIONS REGISTER patent application.

The above system, register-sender, marker and communication register patents and applications are incorporated herein and made a part thereof as though fully set forth.

BACKGROUND AND SUMMARY OF THE INVENTION

In order to provide the necessary reliability required in modern electronic telephone exchanges, particularly an exchange such as the No. 1 EAX disclosed in the above-mentioned copending applications, duplicate computers which run in synchronism are used. Each computer essentially controls its own system in that all critical hardware subsystems are also duplicated. The duplexed computers are monitored, and the system philosophy is such that a single failure anywhere will not result in a system outage.

Each computer includes timing generators, and a system clock is provided for supplying the basic clock pulse train which is required to drive these timing generators. Without the timing pulses provided by the timing generators, the computers cannot function and are effectively dead.

The system clock of the present invention is designed in such a manner that it is "fail-safe," and a single failure of any kind will not prevent generation of clock pulses. At least one of the computer's timing generators will receive clock pulses and, therefore, at least one of the computers will be operational.

More particularly, the system clock consists of two identical clock cards wired for redundant operation. Each card requires a single five volt power supply, and is capable of driving both computers' timing generators. One clock card functions as the main system clock (MSC), and the other functions as the standby system clock (SSC). Clock pulses normally are provided by the MSC to the appropriate subsystem timing generators, however, if a fault develops in the MSC, the pulse output of the MSC is inhibited and the function of providing pulses is transferred to the SSC. The transfer feature always takes place when an ALARM lead on the MSC goes to a logic one.

The clock system design takes into account various different failure modes, including:

a. a power failure in either of the two computers;
b. failure of the oscillator in either clock card;
c. failure of the monitor circuitry;
d. failure of the inhibit circuitry;
e. failure of any single IC chip, or gate; and
f. latent faults.

Accordingly, it is an object of the present invention to provide an improved system clock.

More particularly, it is an object to provide a system clock of a design such that it is "fail-safe," and a single failure of any kind will not prevent generation of clock pulses.

A still further object is to provide such a system clock which can be easily and quickly manually routined, or can be automatically periodically checked by means such as the register-sender maintenance software of the system.

The invention accordingly comprises the several steps and the relation of one or more of such steps with respect to each of the others and the apparatus embodying features of construction, combination of elements and arrangements of parts which are adapted to effect such steps, all as exemplified in the following detailed disclosure, and the scope of the invention will be indicated in the claims.

BRIEF DESCRIPTION OF THE DRAWINGS

For a fuller understanding of the nature and objects of the invention, reference should be had to the following detailed description taken in conjunction with the accompanying drawings, in which.

Similar reference characters refer to similar parts throughout the several views of the drawings.

DESCRIPTION OF THE PREFERRED EMBODIMENT

Figure 2:
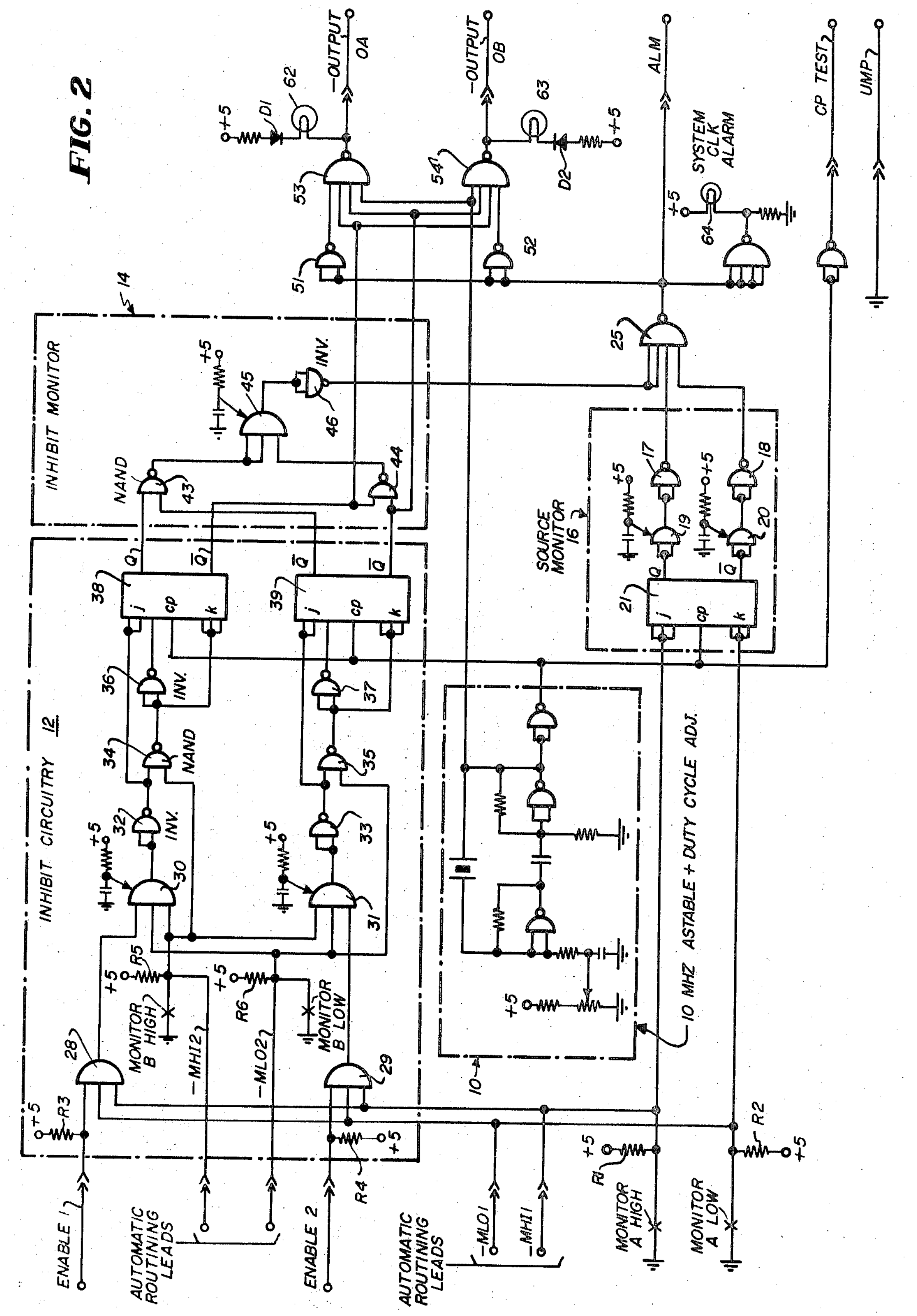
FIG. 2 is a block diagram schematic of one of the two identical clock cards forming either the MSC or the SSC.

Referring now to the drawings, in FIG. 2 one of the two identical clock cards which comprises either the main system clock (MSC) or the standby system clock (SSC) is illustrated. It includes as its principal components a pulse source 10, an inhibit circuit 12, an inhibit monitor 14 and a source monitor 16. The pulse source 10 consists of a crystal controlled 10 MHZ astable oscillator having a built-in duty cycle adjustor which guarantees a 50 percent duty cycle. The output of the oscillator is extended to the clock circuit outputs OA and OB, to the input of the source monitor 16 and to the JK flip-flops 38 and 39.

The inhibit circuit 12 under control of input inhibit signals prevents clock pulses from leaving the clock circuit. The inhibit monitor 14 checks that the inhibit circuit 12 does not inadvertently stop the clock output pulses due to a fault condition. If a fault develops in the inhibit circuit 12, the inhibit monitor 14 causes an alarm lead ALM to go to a logic 1. The source monitor 16 checks that the pulse source 10 is producing pulses, that is, checks for a stuck-at-one or a stuck-at-zero condition. If an absence of pulses is detected, the source monitor 16 causes the alarm lead ALM to go to a logic 1.

More particularly, the source monitor 16 consists of a JK flip-flop 21, two delay gates 19 and 20, and two gate invertors 17 and 18. Normally, both the J and K inputs are at 1, and the JK flip-flop 21 toggles as long as the oscillator or pulse source 10 is producing pulses. The delay gates 19 and 20 delay the positive going outputs approximately 1 microsecond, while the toggle rate of the JK flip-flop 21 is 5 MHZ and its output pulse is approximately 100 nanoseconds, so that the outputs of the gate invertors 17 and 18 to the NAND gate 25 are at 1. The other input to the NAND gate 25 from the inhibit monitor 14 also is at 1, as explained more fully below, thus the alarm lead ALM normally is at 0, indicating proper operation. The J and K inputs are held at 1 via the +5 volts through the resistors R1 and R2. The J and K inputs also have routining leads MHI1 and MLO1 coupled to them, respectively, which leads are brought out from the source monitor 16 and used for routining the clock cards for latent faults by, for example, the register-sender maintenance subsystem. These leads likewise are coupled through pushbuttons MONITOR A HIGH and MONITOR A LOW to ground, for manual routining for the computer complex. The manner in which the clock cards are routined is explained more fully below.

The oscillator or pulse source 10 produces positive and negative (1 and )) going pulses, and the design of the source monitor 16 is such that both stuck-at-one and stuck-at-zero faults are detected. Depending on the particular state of the JK flip-flop 21 and the particular fault at the time, one or the other of the outputs of the delay gates 19 and 20 will go high, after the 1 microsecond delay. This high is inverted by either the gate invertor 17 or 18 and a 0 is coupled to the NAND gate 25, thus causing the alarm lead ALM to go to a logic 1 and thereby indicate a failure. Accordingly, regardless of the failure, the alarm will be provided.

The inhibit circuit 12 includes two input AND gates 28 and 29, the outputs of which are coupled to a pair of AND gates 30 and 31, respectively, which provide a delay of approximately 1 microsecond. The outputs of these AND gates are coupled through gate invertors 32 and 33, to the J inputs of a pair of JK flip-flops 38 and 39. The outputs of the gate invertors 32 and 33 also are coupled to NAND gates 34 and 35, with the outputs of the latter being coupled to the K inputs and through gate invertors 36 and 37 to the J inputs.

The oscillator or pulse source 10 also is coupled to the CP inputs of the JK flip-flops 38 and 39, and these JK flip-flops are operated to transfer their inputs to their outputs when the clock pulses go negative. Normally, as explained more fully below, the J inputs are at 0, and a 0 therefore is transferred to the Q leads. Likewise, the K inputs are at 1, and a 1 is transferred to the $\overline{Q}$ leads. The Q leads of the JK flip-flops 38 and 39 are coupled to the NAND gates 43 of the inhibit monitor 14, while the $\overline{Q}$ leads of these JK flip-flops are coupled to the NAND gate 44. The output of the NAND gate 43, with both of its inputs at 0, will be a 1 and this 1 output is coupled to the AND gate 45 which is designed to provide a delay of approximately 3 microseconds or longer. The output of NAND gate 44, with both of its inputs at 1, will be a 0. The output of AND gate 45 therefore is a 0, and the gate invertor 46 inverts this to a 1, which is coupled to the NAND gate 25. As explained above, this 1 together with the 1's from the source monitor 16 results in a 0 output from the NAND gate 25, indicating that the clock is functioning properly.

This 0 output of the gate 25 also is coupled to and inverted to 1 by a pair of gate invertors 51 and 52, and coupled to a pair of output NAND gates 53 and 54, respectively. The $\overline{Q}$ leads of both the JK flip-flops 38 and 39 also are coupled as inputs to these NAND gates 53 and 54, as is the output from the oscillator or pulse source 10, to gate the clock pulses to the output leads OA and OB.

A pair of routining leads MHI2 and MLO2 also is brought out from the inhibit circuit 12, for routining the clock cards by the register-sender maintenance system. In addition, a MONITOR B HIGH and a MONITOR B LOW pushbutton is provided, for connecting these leads to ground, for manual routining.

One additional ground connection is provided, which connects the UMP lead to ground. This ground connection is used as a card unplugged indicator. When a clock card is removed, the ground connection is broken from the UMP lead and this is used to indicate that the clock card has been removed.

Figure 1:
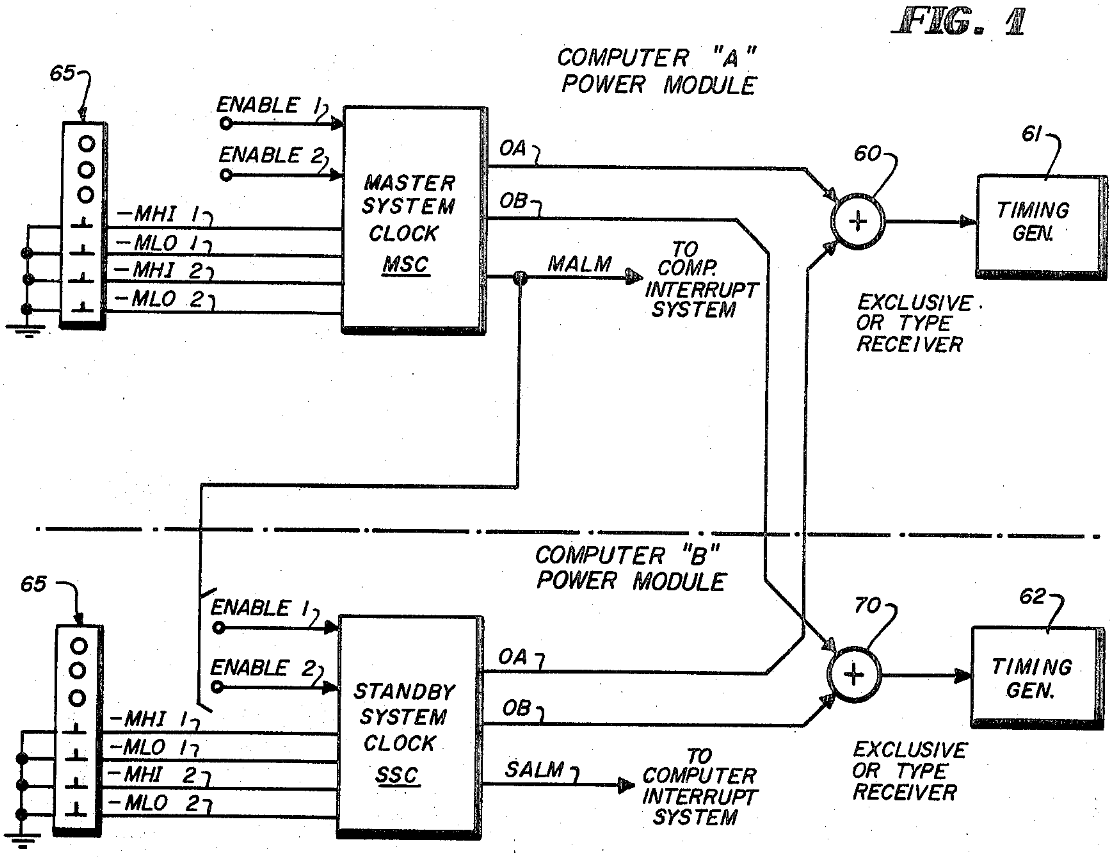
FIG. 1 is a block diagram schematic generally illustrating the manner in which the MSC and the SSC are arranged for redundant operation.

Referring now to FIG. 1, under steady state conditions, the alarm lead of the MSC, designated MALM, and the alarm lead of the SSC, designated SALM, are at 0, indicating that the two clock cards are functioning properly. The ENABLE 1 and ENABLE 2 leads of the MSC are left open but, as can be seen in FIG. 2, these leads are held to a logic 1 via the resistors R3 and R4 to the +5 volts. Correspondingly, the +5 volts through the resistors R1 and R2 couple a logic 1 to the AND gates 28 and 29 so that the gates are enabled and provide a logic 1 output to the AND gates 30 and 31. Logic 1's also are provided to the AND gates 30 and 31, from the +5 volts through the resistors R5 and R6, the outputs of which are a logic 1 and are coupled through the gate invertors 32 and 33 to the J inputs of the JK flip-flops 38 and 39. These same inputs are coupled to the NAND gates 34 and 35. The +5 volts through the resistors R5 and R6 is coupled to these NAND gates 34 and 35, respectively, to provide an output at a logic 1, which is coupled to the K inputs of the JK flip-flops 38 and 39 and through the gate invertors 36 and 37 to the J inputs.

When the clock pulses go negative, the JK flip-flops 38 and 39 transfer these J and K inputs to the NAND gates 43 and 44. The outputs are compared and, after a 3 microsecond delay, are coupled by the AND gate 45 through the gate invertor 46 to the NAND gate 25. The NAND gate 25 places a 0 on the MALM lead, indicating that the MSC is functioning properly. This 0 output also is coupled through the gate invertors 51 and 52, to the output NAND gates 53 and 54. The outputs on the $\overline{Q}$ leads and the clock pulses trigger the NAND gates 53 and 54 to provide the output clock pulses.

As can be seen in FIG. 1, the MALM lead of the MsC is coupled to the ENABLE 1 and ENABLE 2 leads of the SSC and, being at 0, inhibit the SSC by causing the $\overline{Q}$ lead outputs from the JK flip-flops 38 and 39 to assume a logic o, which will hold the outputs of the NAND gates 53 and 54 of the SSC at a logic 1.

The duplexed systems are under the control of the MSC, and the outputs of both the MSC and the SSC are coupled to an exclusive OR gate 60 and 70 in each receiving system to accept pulses from either the MSC or the SSC, for driving, for example, the timing generators 61 and 62 thereof.

A failure in the oscillator or pulse source 10 of the MSC will be detected by its source monitor 16, in the manner described above. After the 1 microsecond delay, the MALM lead will go to a 1, indicating that a failure has occurred. The 1 on the MALM lead will also force the outputs OA and OB to a 1.

When the 0 on the ENABLE 1 and ENABLE 2 leads to the SSC goes to a 1, after approximately 1 microsecond delay provided by the AND gates 30 and 31, the SSC will start to transmit pulses. The duplexed systems now are under control of the SSC.

The MSC card now can be removed without affecting system operation. When it is removed, the mechanical ground connection to the UMP lead of the MSC is broken and signals its removal. When the MSC Card is replaced, the UMP lead will go to ground. Assuming the MSC card again is operational, the MALM lead will go to 0 and, the SSC again is inhibited, after passing a final full pulse, in the manner described above. After approximately a 1 microsecond delay, the MSC will start to transmit pulses. The duplexed systems will now be back under control of the MSC.

A failure in the inhibit circuit 12 of the MSC will be detected by the inhibit monitor 14 detecting the difference in the outputs of the two JK flip-flops 38 and 39, and approximately 3 microseconds later, the MALM lead will go to a logic 1, indicating that a failure has occurred. An automatic transfer is made to the SSC, in the manner described above. Again, the MSC card can be removed, and replaced, without affecting system operation. If one of the gates fails such that the output NAND gates 53 and 54 are inhibited, there will be an absence of clock pulses during the 3 microseconds delay period.

A power failure in the MSC card will result in the output leads OA and OB and the alarm lead MALM going to an electrically floating condition which is equivalent to a logic 1. A power failure in the MSC card, therefore, will result in the same action described above, in the event the oscillator or pulse source 10 had failed. An automatic transfer to the SSC is made and, when power is restored, an automatic transfer will be made back to the MSC card.

It may be noted that the output NAND gates 53 and 54 are not monitored. A failure in one of these gates will block pulse transmission to one of the duplexed systems and will incapacitate that system. No failure indication is given and no transfer to the SSC is made, but this failure will be detected by the computer Third Party circuit when the computers go out of synchronism.

The MSC card may be removed at any time, by operating one of the routining pushbuttons, such as the MONITOR A HIGH pushbutton, while pulling the card out. The MSC is stopped cleanly and the SSC is started up cleanly. The MSC may then be replaced at any time.

Under normal conditions, the duplexed systems are under control of the MSC card. A failure in the SSC oscillator or pulse source 10 will result in the SALM lead going to a "one" indicating that a failure has occurred in the SSC card. In such a case, none of the timing functions is interrupted, and the SSC card can be removed at any time. When it is removed, ground is removed from its UMP lead indicating the removal of the SSC card and, when replaced, the lead UMP will again go to a 0.

A power failure in the SSC card will result in its output leads OA and OB and the SALM lead going to an electrically floating condition equivalent to a logic 1. Therefore, the resulting action is the same as if the oscillator or pulse source 10 had failed.

If the MSC card is functioning properly, the SSC card can be removed and replaced at any time without disrupting timing functions. If the MSC has failed, the SSC card, of course, cannot be removed without terminating pulse transmission.

The output gates 53 and 54 of the SSC are held at a logic 1 when the MSC card is functioning properly. If an output gate 53 or 54 in the SSC were to fail such that its output went to ground, one of the duplexed systems will be receiving clock pulses 180° out of phase with respect to the other systems clock pulses. If the duplexed systems are sufficiently out of phase, corrective action will be taken within the driven systems to bring the timing generators back in phase. The output gate failure will not be detected otherwise, until the SSC is routined for latent faults, as more fully described below.

When a gate in the inhibit circuit 12 fails in a catastrophic mode, the NAND output gates 53 and 54 will be enabled and clock pulses will be transmitted "illegally" out of the SSC card. The exclusive "OR" receiver gates 60 and 70 will receive two pulse trains that are 10MHZ each but out of synchronism with each other. This would result in timing pulses having a "random" pattern after the two pulse trains are exclusively "OR'ed" together. The inhibit monitor 14, however, will detect this failure in the inhibit circuit 12 and approximately 3 microseconds later the SALM lead will go to a 1, cutting off pulse transmission and signaling a failure has occurred in the SSC card.

The system clock is designed so that a single failure anywhere will not cause system outage. A failure in any one gate is not permitted to block timing pulses out of both clock cards nor are pulses permitted to pass out of both clock cards simultaneously, except for a brief period during certain failure modes, as explained above. A failure can occur in such a manner that one computer is down. A gate can also fail in such a mode that timing functions are not interrupted. This type of failure is a latent fault and is of no consequence until a second gate fails which now calls on the "dead" gate to perform its functions. At this time, a catastrophic failure results.

It is therefore necessary to periodically check the various monitors to see that they are functioning properly. For this purpose, the above-mentioned routining leads MLO1, MHI1, MLO2 and MHI2 are provided.

The MLO1 routining lead provides a source monitor 16 check, for one half of the source monitor circuit. A O logic level placed on this MLO1 routining lead causes the outputs OA and OB to stay at a logic 1, via the inhibit circuit 12, thus inhibiting clock pulses from leaving the clock card. This 0 logic level also is extended to the source monitor 16, preventing the JK flip-flop 21 from toggling and putting it in a "SET" state, and approximately 1 microsecond later, the ALM lead will go to a logic 1, indicating a failure and thus the proper operation of one half of the source monitor 16.

The second half of the source monitor 16 is checked by placing a logic O level on the MHI1 routining lead. This logic O level will again cause the outputs OA and OB to stay at a logic 1, inhibiting clock pulses from leaving the clock card. The logic O level also is extended to the source monitor 16 preventing the JK flip-flop 21 from toggling and putting it in a RESET" state, and after approximately 1 microsecond, the ALM lead goes to a logic 1, thus indicating that the second half of the source monitor 16 is functioning properly.

A O logic level placed on the MLO2 lead provides a check of the inhibit monitor 14, by simulating a fault in one half of the inhibit circuitry 12. JK flip-flop 38 is placed in an "INHIBIT" state and JK flip-flop 39 is placed in an "ENABLE" state. Clock pulses are inhibited from leaving the clock card, and approximately 3 microseconds later the ALM lead goes to a logic 1, indicating a failure and thus the proper operation of one half of the inhibit monitor 14. A O logic level placed on the MHI2 lead provides the same results, by simulating a fault in the other half of the inhibit circuitry 12. In this fashion, the operation of both the inhibit circuit 12 and the inhibit monitor 14 can be checked.

These above-discussed routining leads are made use of by, for example, register-sender maintenance software to periodically check the register-sender 10MHZ subsystem clock.

Figure 3:
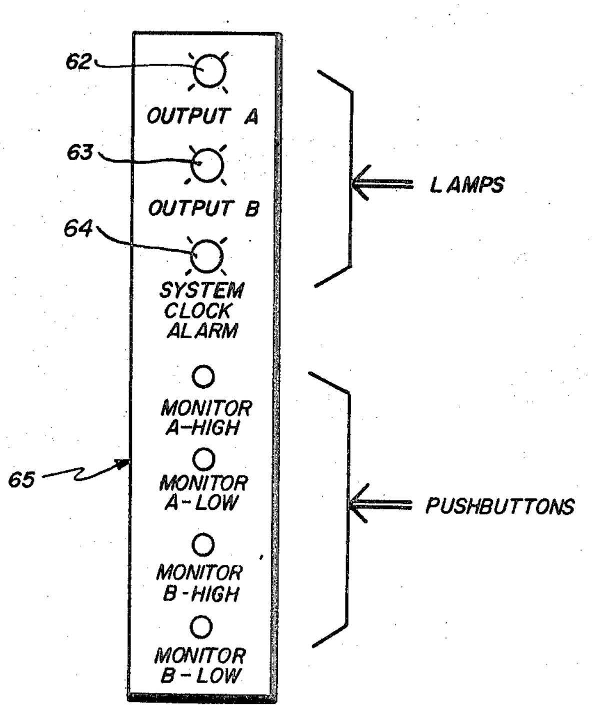
FIG. 3 is a front plan view of the clock board of either the MSC or the SSC.

A clock board has a front panel 65, as generally shown in FIG. 3, which is provided for each clock card MSC and SSC and is equipped with the four manual pushbuttons MONITOR A HIGH, MONITOR A LOW, MONITOR B HIGH and MONITOR B LOW described above, together with three lamps 62, 63 and 64 for providing a means for manually checking the "ON-LINE" system clock. The manual pushbuttons extend test signals to the clock circuits and the three lamps provide visual indications of expected circuit responses. The four manual pushbuttons provide the same input test conditions that are provided over the above-described routining leads.

More particularly, as described above, in an "ON-LINE" condition, the MALM lead on the MSC is wired directly to the ENABLE 1 and ENABLE 2 leads of the SSC. Therefore, under normal operation conditions, (that is, the MSC providing pulses to the timing generators) the SSC outputs OA and OB are inhibited due to a O logic level on the MALM lead.

As can be seen in FIG. 2, each of the four pushbuttons when pushed places a O logic level (ground) on the corresponding routining leads as follows:

MONITOR A LOW places ground on MLO1
MONITOR A HIGH places ground on MHI1
MONITOR B LOW places ground on MLO2
MONITOR B HIGH places ground on MHI2

The results of placing O logic levels on the routining leads are described above. In each case, the ALM lead will go to a logic 1. Also, as can be seen in FIG. 2, the lamp 64 which is RED and is the system clock alarm is lighted.

Since a transfer is effected when a pushbutton is pushed on the MSC, it is necessary to be sure that the SSC is in good condition before causing a transfer. The procedure in manually routining the system clocks is as follows. Each pushbutton on the SSC is momentarily pushed one at a time. While each pushbutton is pushed, the RED alarm lamp 64 on the SSC board will light. The two WHITE lamps 62 and 63 which are related to the outputs OA and OB, respectively, should not be lit and should remain extinguished.

Thereafter, each pushbutton on the MSC board is momentarily pushed, one at a time. The RED alarm lamp 64 on the MSC board should light. The two WHITE lamps 62 and 63 which are related to the outputs OA and OB of the MSC, respectively, which were glowing dimly before the pushbutton was pushed, should be extinguished. The two WHITE lamps 62 and 63 on the SSC board should now glow dimly, indicating that clock pulses are being provided by the SSC. When each pushbutton is released, the RED alarm lamp 64 on the MSC board and the WHITE lamps 62 and 63 on the SSC board will be extinguished and the WHITE lamps 62 and 63 on the MSC board will glow dimly.

An analysis of the system clock card shown in FIG. 2 will show that it is wired in such a manner that no single gate failure or chip failure can result in stopping the clock pulses from at least reaching one of the timing generators. This is accomplished by distributing the logic gates such that a failure will either result in the ALM lead going to a logic 1, or the failure results in a latent failure.

It will thus be seen that the objects set forth above among those made apparent from the preceding description, are efficiently attained and certain changes may be made in carrying out the above method and in the construction set forth. Accordingly, it it intended that all matter contained in the above description or shown in the accompanying drawings shall be interpreted as illustrative and not in a limiting sense.

I claim:

1. A clock system for providing clock pulses comprising a master system clock and a standby system clock, said clock pulses normally being provided by said master system clock and the output thereof being inhibited and the function of providing clock pulses being automatically transferred to said standby system clock when a fault develops in said master system clock, said transfer automatically taking place when alarm signal is placed on an alarm lead on said master system clock, said master system clock and said standby system clock each comprising output gate means, a pulse source for providing clock pulses to said output gate means, a source monitor for monitoring the output of said pulse source, said source monitor upon detecting that said pulse source fails to produce said output clock pulses causing an alarm signal to be placed on said alarm lead, said alarm signal indicating the failure of said pulse source and blocking said output gate means to prevent any pulses from leaving said system clock, an inhibit circuit coupled to and operable to control the passing of said clock pulses through said output gate means, said inhibit circuit normally permitting said clock pulses to pass through said output gate means and being operable to block said output gate means to prevent said clock pulses from leaving said system clock, an inhibit monitor for monitoring the operation of said inhibit circuit, said inhibit monitor causing said alarm signal to be placed on said alarm lead when a fault condition occurs within said inhibit circuit which causes the latter to inadvertently block said output gate means, said alarm lead of said master system clock being coupled to said inhibit circuit of said standby system clock and normally having a signal thereon to operate said inhibit circuit to block said output gate means of said standby system clock, said alarm signal when placed on said alarm lead of said master system clock operating said inhibit circuit of said standby system clock to permit said clock pulse to pass through said output gate means thereof, whereby said clock system is "fail-safe" and a single failure of any kind will not prevent generation of clock pulses.

2. The clock system of claim 1, wherein said master system clock and said standby system clock each further include alarm gate means, said source monitor and said inhibit monitor both being coupled to said alarm gate means and operable upon detecting a failure of one or both said pulse source and said inhibit circuit to cause said alarm gate to couple said alarm signal onto said alarm lead.

3. The clock system of claim 2, wherein said inhibit circuits each comprises a pair of flip-flop means, each having a pair of outputs, one of said outputs of each of said flip-flop means being coupled to and controlling said output gate means.

4. The clock system of claim 3, wherein said inhibit monitors each checks for a difference in the output states between said pair of flip-flop means and causes said alarm signal to be provided when a difference exists.

5. The clock system of claim 4, wherein said inhibit monitors each further includes means for causing said alarm signal to be provided when a difference exists for a pre-established time period.

6. The clock system of claim 2, wherein said inhibit circuits each comprises a pair of flip-flop means, each having a pair of outputs, one of said outputs of each of said flip-flop means being coupled to and controlling said output gate means, said inhibit monitors each including a pair of input gates and an output gate, one of said outputs of each of said flip-flop means being coupled to one of said pair of input gates and the other one of said outputs of each of said flip-flop means being coupled to the other one of said pair of input gates, said pair of input gates both being coupled to said output gate, said pair of input gates and said output gate being operable to detect the difference between the outputs of said pair of flip-flop means and to cause said alarm signal to be provided when a difference exists.

7. The clock system of claim 6, wherein said inhibit monitors each comprises means for causing said alarm signal to be provided when a difference exists for a pre-established time period.

8. The clock system of claim 2, wherein said source monitors each is comprised of flip-flop means having a pair of inputs and a pair of outputs, said flip-flop means when the same pre-established logic signal is coupled to each of said inputs being caused to toggle when said clock pulses are coupled to it to alternately couple said input logic signals to said pair of outputs, and gating means coupled to said outputs for causing said alarm gate to couple said alarm signal onto said alarm lead when said clock pulses do not appear.

9. The clock system of claim 8, wherein said source monitors each further comprise delay means, wherein said alarm signal is provided when said clock pulses disappear for a pre-established time period.

10. The clock system of claim 2, wherein said output gate means in each said master system clock and said standby system clock comprises a pair of output gates, said clock pulses passing through both of said output gates and thereby providing two clock pulse trains.

11. The clock system of claim 2, wherein said master system clock and said standby system clock each further having routining leads to which appropriate logic signals can be coupled to to simulate a fault condition in said inhibit circuit and in said source monitor, whereby said master system clock and said standby system clock can be routined for latent failures.

12. The clock system of claim 2, wherein said master system clock and said standby system clock each further comprise manually operable switch means for coupling appropriate logic signals to said inhibit circuit and said source monitor to simulate a fault condition therein, whereby said master system clock and said standby clock can be manually routined for latent failures.

* * * * *